(12) United States Patent
Yaman et al.

(10) Patent No.: US 10,182,472 B2
(45) Date of Patent: Jan. 15, 2019

(54) WIRELESS KITCHEN APPLIANCE OPERATED ON INDUCTION HEATING COOKER

(71) Applicant: Arcelik Anonim Sirketi, Istanbul (TR)

(72) Inventors: Onur Yaman, Istanbul (TR); Ahmet Yorukoglu, Istanbul (TR); Sefa Hazir, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 767 days.

(21) Appl. No.: 14/370,029

(22) PCT Filed: Nov. 30, 2012

(86) PCT No.: PCT/EP2012/074113
§ 371 (c)(1),
(2) Date: Jun. 30, 2014

(87) PCT Pub. No.: WO2013/098040
PCT Pub. Date: Jul. 4, 2013

(65) Prior Publication Data
US 2014/0332523 A1    Nov. 13, 2014

(30) Foreign Application Priority Data
Dec. 29, 2011 (TR) .............. a 2011 13228

(51) Int. Cl.
    *H05B 6/12* (2006.01)
(52) U.S. Cl.
    CPC ............ *H05B 6/12* (2013.01); *H05B 6/1236* (2013.01); *Y02B 40/123* (2013.01)

(58) Field of Classification Search
    None
    See application file for complete search history.

(56) References Cited

U.S. PATENT DOCUMENTS

| 2,133,494 A | 10/1938 | Waters |
| 3,594,627 A | 7/1971 | Lesher |
| (Continued) | | |

FOREIGN PATENT DOCUMENTS

| CN | 86201937 U | 12/1986 |
| CN | 101743777 A | 6/2010 |
| (Continued) | | |

OTHER PUBLICATIONS

International search report for PCT application No. PCT/EP2012/074113 and references contained therein.

(Continued)

*Primary Examiner* — Ibrahime A Abraham
*Assistant Examiner* — Gyounghyun Bae
(74) *Attorney, Agent, or Firm* — Kilpatrick Townsend & Stockton LLP

(57) ABSTRACT

The present invention relates to a kitchen appliance (1) suitable for being wirelessly operated on an induction heating cooker (K), comprising a programmable microcontroller (2), one or more than one electronic circuit (3) that provides the microcontroller (2) to control the communication means, user interface and sensors, providing communication with the induction heating cooker (K) whereon the kitchen appliance (1) is operated, a power control circuitry (4) that supplies the microcontroller (2) and the electronic circuits (3) with low level DC voltage, a rectifier (5) that converts the AC voltage to DC voltage and a buffer capacitor (6) which filters the DC voltage at the rectifier (5) outlet.

13 Claims, 3 Drawing Sheets

(56) References Cited

U.S. PATENT DOCUMENTS

Figure 1:
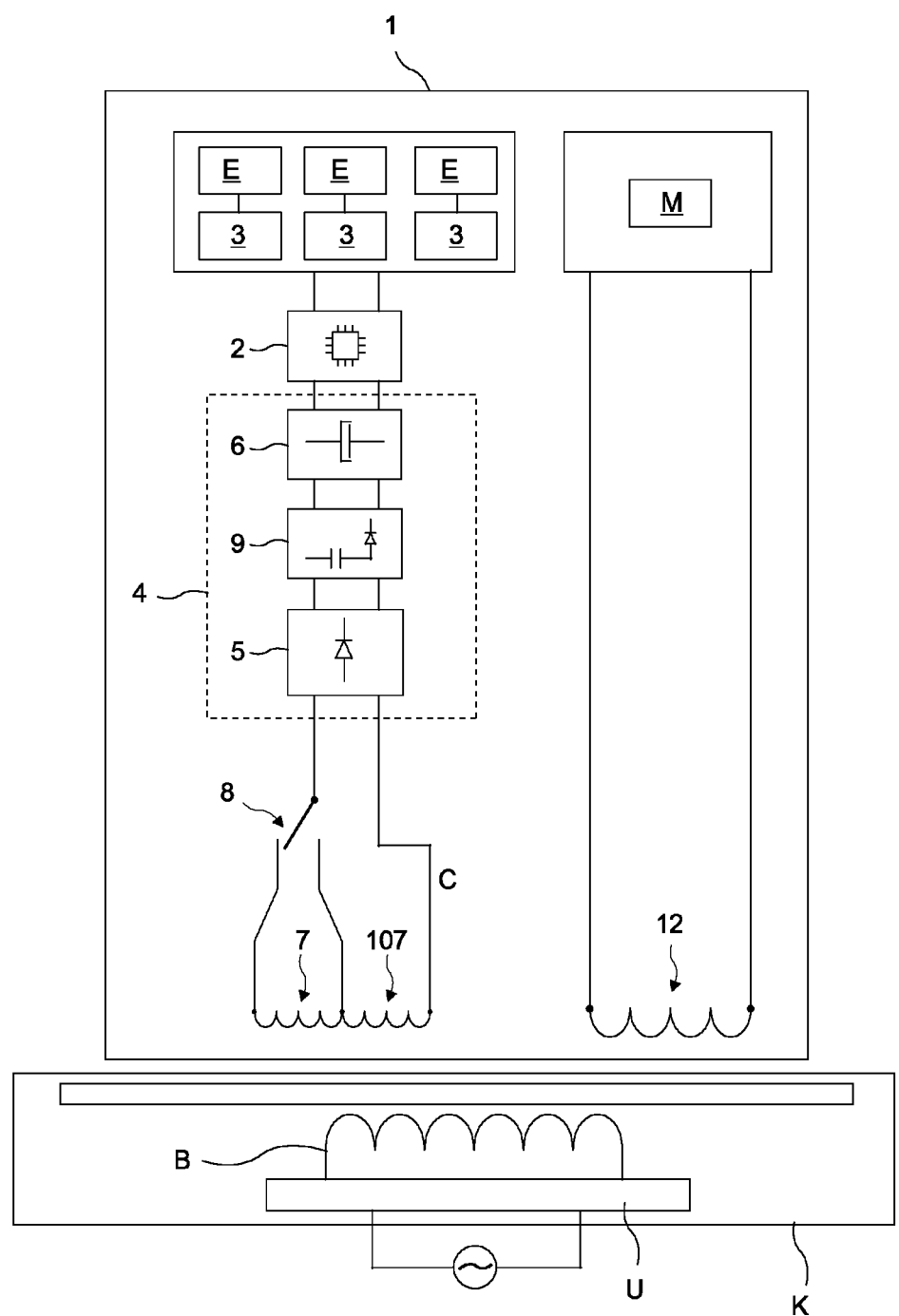

| | | |
|---|---|---|
| 3,742,178 A | 6/1973 | Harnden, Jr. |
| 3,761,668 A | 9/1973 | Harnden, Jr. et al. |
| 3,842,338 A * | 10/1974 | Walden ............... H02M 7/523 |
| | | 219/625 |
| 3,889,090 A | 6/1975 | Mackenzie |
| 3,953,783 A | 4/1976 | Peters, Jr. |
| 3,978,307 A | 8/1976 | Amagami et al. |
| 4,159,409 A | 6/1979 | Hedberg |
| 4,555,608 A | 11/1985 | Mizukawa et al. |
| 4,716,353 A | 12/1987 | Engelmann |
| 4,897,518 A | 1/1990 | Mucha et al. |
| 4,996,405 A | 2/1991 | Poumey et al. |
| 5,084,699 A | 1/1992 | DeMichele |
| 5,991,170 A | 11/1999 | Nagai et al. |
| 6,232,585 B1 | 5/2001 | Clothier et al. |
| 6,255,635 B1 | 7/2001 | Thompson et al. |
| 6,259,259 B1 | 7/2001 | Raffalt et al. |
| 6,304,424 B1 * | 10/2001 | Mett ................ H01L 21/6831 |
| | | 279/128 |
| 6,316,755 B1 * | 11/2001 | Ulrich ................... H05B 6/06 |
| | | 219/660 |
| 6,384,387 B1 | 5/2002 | Owens et al. |
| 6,385,056 B1 | 5/2002 | Gucyski |
| 6,812,440 B2 | 11/2004 | Hirota et al. |
| 6,949,915 B2 | 9/2005 | Stanley |
| 7,355,150 B2 | 4/2008 | Baarman et al. |
| 7,390,994 B2 | 6/2008 | Oh et al. |
| 7,865,071 B2 | 1/2011 | Baarman |
| 7,952,322 B2 | 5/2011 | Partovi et al. |
| 8,400,017 B2 | 3/2013 | Kurs et al. |
| 8,417,359 B2 * | 4/2013 | Tsai ..................... H02J 17/00 |
| | | 307/104 |
| 8,591,403 B2 * | 11/2013 | Yoshida ............. A61B 1/00016 |
| | | 600/109 |
| 8,853,892 B2 | 10/2014 | Fells et al. |
| 9,318,912 B2 | 4/2016 | Baarman et al. |
| 9,356,659 B2 | 5/2016 | Partovi |
| 9,473,209 B2 * | 10/2016 | Cooper ................. H02J 5/005 |
| 9,496,732 B2 | 11/2016 | Partovi |
| 9,667,084 B2 | 5/2017 | Pigott |
| 2002/0117497 A1 | 8/2002 | Bassill et al. |
| 2005/0067410 A1 | 3/2005 | Ring |
| 2006/0220592 A1 | 10/2006 | Barrenscheen et al. |
| 2007/0012684 A1 | 1/2007 | Liu et al. |
| 2007/0214967 A1 | 9/2007 | Has et al. |
| 2007/0215605 A1 * | 9/2007 | Baier ................... H05B 6/062 |
| | | 219/622 |
| 2007/0221068 A1 | 9/2007 | Boussemart et al. |
| 2007/0221668 A1 | 9/2007 | Baarman et al. |
| 2007/0278216 A1 | 12/2007 | Tominaga et al. |
| 2008/0037966 A1 | 2/2008 | Baarman |
| 2008/0223852 A1 | 9/2008 | Bassill et al. |
| 2009/0001074 A1 | 1/2009 | Shirokawa et al. |
| 2009/0096413 A1 | 4/2009 | Partovi et al. |
| 2009/0129126 A1 * | 5/2009 | Boys ..................... H02J 50/12 |
| | | 363/37 |
| 2010/0007307 A1 | 1/2010 | Baarman et al. |
| 2010/0060186 A1 | 3/2010 | Taipale et al. |
| 2010/0116820 A1 | 5/2010 | Pan et al. |
| 2010/0253234 A1 | 10/2010 | Hu et al. |
| 2010/0288754 A1 | 11/2010 | Ookuma |
| 2011/0049997 A1 * | 3/2011 | Urano ................... H02J 5/005 |
| | | 307/104 |
| 2011/0095618 A1 * | 4/2011 | Schatz ................... H03H 7/40 |
| | | 307/104 |
| 2011/0115303 A1 | 5/2011 | Baarman et al. |
| 2011/0116823 A1 | 5/2011 | Suda |
| 2011/0304216 A1 | 12/2011 | Baarman |
| 2012/0000903 A1 | 1/2012 | Baarman et al. |
| 2012/0007519 A1 * | 1/2012 | Urano ................ H05B 33/0815 |
| | | 315/281 |
| 2012/0068550 A1 * | 3/2012 | Boer ..................... H02J 7/025 |
| | | 307/104 |
| 2012/0091794 A1 * | 4/2012 | Campanella ............ H03H 7/40 |
| | | 307/11 |
| 2012/0132647 A1 * | 5/2012 | Beverly ................ H05B 6/062 |
| | | 219/624 |
| 2012/0139356 A1 | 6/2012 | Jung et al. |
| 2012/0146576 A1 * | 6/2012 | Partovi ................. H01F 7/0252 |
| | | 320/108 |
| 2012/0154260 A1 | 6/2012 | Decraemer et al. |
| 2012/0161534 A1 | 6/2012 | Urano |
| 2012/0235566 A1 | 9/2012 | Karalis et al. |
| 2012/0248890 A1 | 10/2012 | Fukushima |
| 2012/0305545 A1 * | 12/2012 | Brosnan ................ H05B 6/065 |
| | | 219/622 |
| 2013/0021827 A1 | 1/2013 | Ye |
| 2013/0057167 A1 | 3/2013 | Angeles |
| 2015/0013549 A1 | 1/2015 | Yaman et al. |
| 2015/0264751 A1 | 9/2015 | Yaman et al. |

FOREIGN PATENT DOCUMENTS

| | | |
|---|---|---|
| DE | 10319532 A1 | 11/2004 |
| DE | 102006017801 A1 | 11/2007 |
| DE | 102008054904 A1 | 6/2010 |
| EP | 0394148 A1 | 10/1990 |
| EP | 0675671 A2 | 10/1995 |
| EP | 1130752 A2 | 9/2001 |
| EP | 1571889 A1 | 9/2005 |
| EP | 1734789 A1 | 12/2006 |
| JP | S4214520 Y1 | 8/1967 |
| JP | S5033539 B1 | 10/1975 |
| JP | S52136860 A | 11/1977 |
| JP | S5394676 U | 8/1978 |
| JP | S5511653 A | 1/1980 |
| JP | H02299192 A | 12/1990 |
| JP | H05108172 A | 4/1993 |
| JP | H0620766 A | 1/1994 |
| JP | H10165294 A | 6/1998 |
| JP | H1195846 A | 4/1999 |
| JP | H11332135 A | 11/1999 |
| JP | 2000295774 A | 10/2000 |
| JP | 2000347747 A | 12/2000 |
| JP | 2003525518 A | 8/2003 |
| JP | 2007018422 A | 1/2007 |
| JP | 2009049880 A | 3/2009 |
| JP | 2009140892 A | 6/2009 |
| JP | 2009530584 A | 8/2009 |
| JP | 2011130474 A | 6/2011 |
| JP | 2012514495 A | 6/2012 |
| WO | 9832310 A1 | 7/1998 |
| WO | 9941950 A2 | 8/1999 |
| WO | 0165894 A1 | 9/2001 |
| WO | 0217684 A2 | 2/2002 |
| WO | 2007088209 A1 | 8/2007 |
| WO | 2007107888 A2 | 9/2007 |
| WO | 2007122049 A1 | 11/2007 |
| WO | 2009037783 A1 | 3/2009 |
| WO | 2009117929 A1 | 10/2009 |
| WO | 2010069828 A1 | 6/2010 |
| WO | 2010080738 A1 | 7/2010 |
| WO | 2011003301 A1 | 1/2011 |

OTHER PUBLICATIONS

Written opinion of the international searching authority for PCT application No. PCT/EP2012/074113 and references contained therein.
Final Office Action dated Jul. 26, 2017, of U.S. Appl. No. 14/370,014; 28 pgs.
Final Office Action dated Mar. 17, 2017, of U.S. Appl. No. 14/370,022; 30 pgs.
International search report and written opinion, dated Jan. 25, 2013, of International Application No. PCT/EP2012/073638; 8 pgs.
International search report and written opinion, dated Feb. 21, 2013, of International Application No. PCT/EP2012/076567; 8 pgs.
Non-Final Office Action dated Aug. 30, 2016, of U.S. Appl. No. 14/370,022; 86 pgs.
Non-Final Office Action dated Mar. 10, 2017, of U.S. Appl. No. 14/370,014; 23 pgs.

(56) References Cited

OTHER PUBLICATIONS

Non-Final Office Action dated Nov. 29, 2017, of U.S. Appl. No. 14/370,014; 41 pgs.
Non-Final Office Action dated Feb. 22, 2018, of U.S. Appl. No. 14/370,022; 44 pgs.

* cited by examiner

WIRELESS KITCHEN APPLIANCE OPERATED ON INDUCTION HEATING COOKER

The present invention relates to a wireless kitchen appliance that is operated on the induction heating cooker.

The use of kitchen appliances on the induction heating cooker by the principle of wireless power transmission is known. The wireless kitchen appliances are passive heating devices like pots and pans, active heating devices like kettle, coffee machine, toaster or electromechanical devices like mixer, blender that are operated with the electric motor. In some embodiments, user interface, sensors and communication means like RFID that provide communication with the induction heating cooker and that adds "smart" features to these appliances are disposed on the wireless kitchen appliances. Low level electrical power is required for energizing the electronic circuits and the microprocessor, that controls these circuits, on the wireless kitchen appliance. This electrical power is supplied from the induction coil in the induction heating cooker by means of a receiver coil. The microcontroller and the other electronic circuits have to be supplied with an uninterrupted and constant voltage. If the voltage level of the power source that feeds these components is lower or higher than the required voltage, the operation of the microcontroller and the other electronic circuits is interrupted and the wireless kitchen appliance cannot be operated on the induction heating cooker in the desired manner. A ferromagnetic container is placed on the induction heating cooker for the normal heating operation and the user can heat by means of a knob scaled at different power levels for example between 1 to 9. The present power scale settings used for the ferromagnetic container are also used for the wireless kitchen appliance. If the wireless kitchen appliance is, for example a kettle, the power adjustment of the resistant heater can be made and the speed of the electric motor is adjusted in an appliance like the mixer with electric motor. When the power scale setting of the induction heating cooker is changed by the user, the electrical voltage supplied to the power source circuitry also changes and the desired continuous and constant voltage cannot be obtained. Furthermore, the fluctuations in the mains voltage whereto the induction heating cooker is connected affect the power control circuitry adversely. In the state of the art, power storage elements like battery are used in order to keep the voltage supplied by the power control circuitry constant, however inconveniences arise like requiring a separate structure for running out, changing or charging of the battery. Super capacitors can also be used instead of the battery however the cost is quite high.

The International Patent Application No. WO9941950 relates to a cooking vessel that is used in induction heating cooktops.

The International Patent Application No. WO2010080738 relates to a smart cookware that is wirelessly operated with an inductive power supply.

The U.S. Pat. No. 7,355,150 relates to a cooking appliance that is energized with non-contact power supply.

The aim of the present invention is the realization of a kitchen appliance that is operated wirelessly on the induction heating cooker and of which the electronic circuits are prevented from being affected by the voltage changes.

The kitchen appliance realized in order to attain the aim of the present invention, explicated in the first claim and the respective claims thereof, is an appliance like cooking container, kettle, coffee machine or mixer that is operated wirelessly on an induction heating cooker. User interface, sensors and communication members that provide communication with the induction heating cooker are disposed in the kitchen appliance. The electronic circuits, switches etc. that operate these members are controlled by the microcontroller. The microcontroller and the other electronic circuits are energized by a power control circuitry with low level DC voltage. The kitchen appliance comprises more than one receiver coil that partially collects and provides transfer of the power generated by the induction coil in the induction heating cooker to the power control circuitry and a switching means that provides one or more than one receiver coil to be activated or deactivated.

On the kitchen appliance, the receiver coils are positioned one within the other or one above the other and connected to each other in series or in parallel.

In an embodiment of the present invention, the voltage changes are detected by means of a peak voltage tracker disposed between the rectifier and the buffer capacitor. The microcontroller actuates the switching means depending on the feedback of the peak voltage tracker and provides one or more than one receiver coil to be activated or deactivated.

In another embodiment of the present invention, the kitchen appliance comprises a transformer disposed between the receiver coils and the rectifier and a resonant circuit disposed after the transformer.

In another embodiment of the present invention, the microcontroller deactivates components like LED, display, backlight that draw high power in the kitchen appliance in situations wherein the induction heating cooker is operated at low power settings.

In the kitchen appliance of the present invention, the microcontroller and the other electronic circuits are provided to be supplied with constant and uninterrupted DC voltage. Under conditions wherein the voltage applied from outside to the power control circuitry changes, occurrence of error in the microcontroller and the electronic circuits is prevented, and they are protected from variable voltage conditions. Elements like battery, super capacitor are not required in order to keep the voltage level provided by the power control circuitry constant.

The kitchen appliance realized in order to attain the aim of the present invention is illustrated in the attached figures, where:

FIG. 1—is the schematic view of the wireless kitchen appliance operated on an induction heating cooker.

Figure 2:
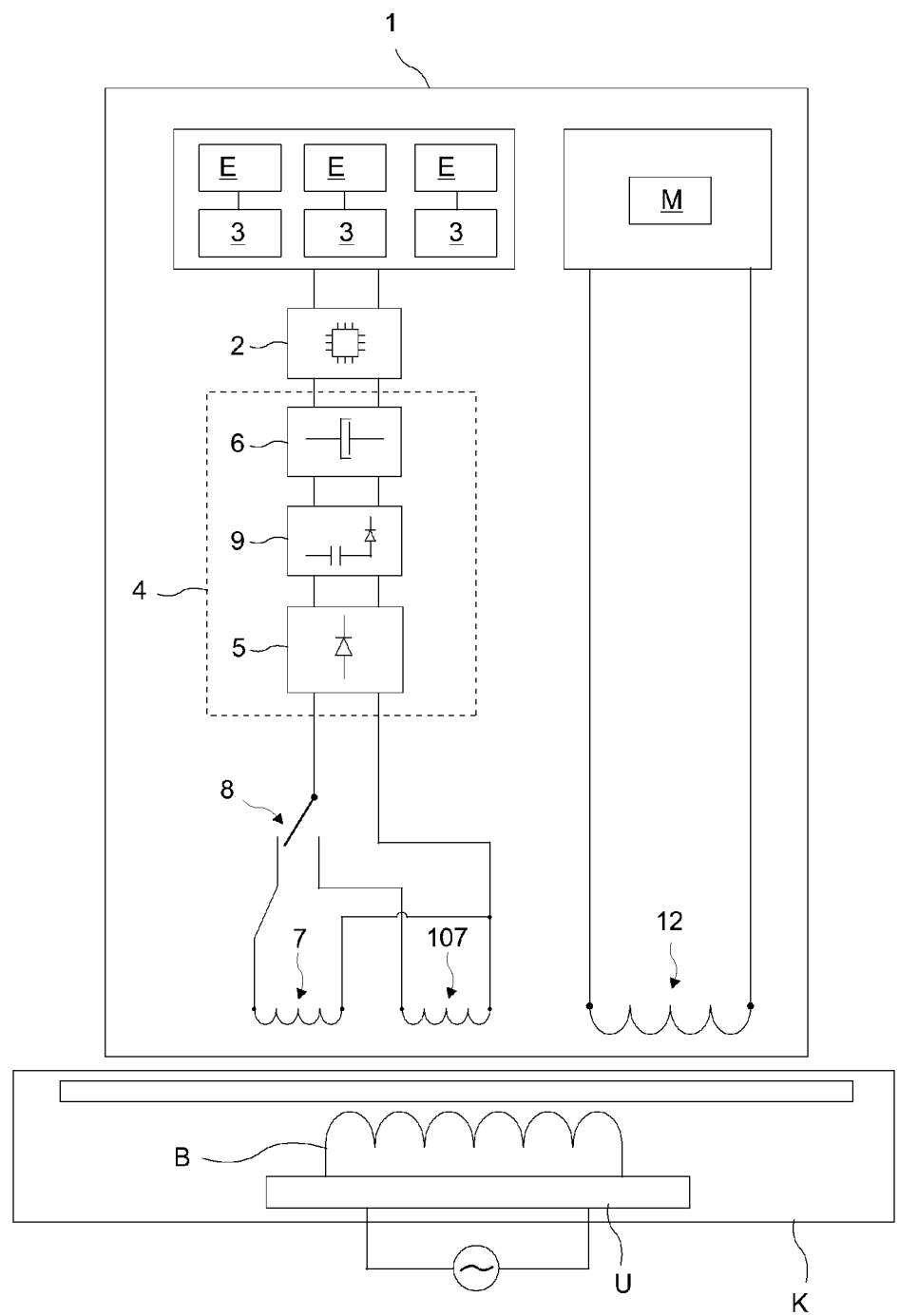

FIG. 2—is the schematic view of the wireless kitchen appliance operated on an induction heating cooker in an embodiment of the present invention.

Figure 3:
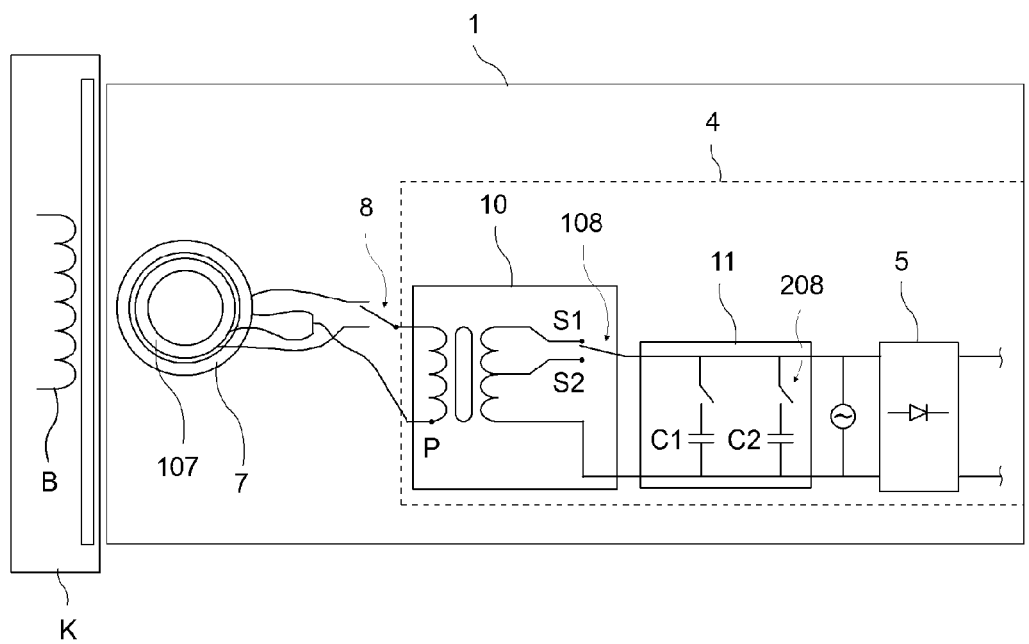

FIG. 3—is the schematic view of the wireless kitchen appliance operated on an induction heating cooker in another embodiment of the present invention.

The elements illustrated in the figures are numbered as follows:

1. Kitchen appliance
2. Microcontroller
3. Electronic circuit
4. Power control circuitry
5. Rectifier
6. Buffer capacitor
7. Receiver coil
8. 108, 208 Switching means
9. Peak voltage tracker
10. Transformer
11. Resonant circuit
12. High power receiver coil The kitchen appliance (1) is suitable for being operated wirelessly on an induction heating cooker (K) with the power generated by the induction coil (B). The induction coil (B) situated in the induction heating cooker (K) is operated by a power source unit (U) that converts the AC mains voltage to DC voltage as in the state of the art.

The kitchen appliance (1) comprises a programmable microcontroller (2), one or more than one electronic circuit (3) that provides the microcontroller (2) to control the communication and/or means (E) like RFID, user interface and sensors, providing communication with the induction heating cooker (K) whereon the kitchen appliance (1) is operated, a power control circuitry (4) that supplies the microcontroller (2) and the electronic circuits (3) with low level DC voltage, a rectifier (5) disposed in the power control circuitry (4), that converts the AC voltage to DC voltage and a buffer capacitor (6) which filters the DC voltage at the rectifier (5) outlet.

The kitchen appliance (1) of the present invention comprises more than one receiver coil (7, 107) that partially collects and provides transfer of the power generated by the induction coil (B) to the power control circuitry (4) and a switching means (8) that is controlled by the microcontroller (2), that regulates the voltage at the outlet of the receiver coils (7, 107) by activating or deactivating one or more than one receiver coil (7, 107) in situations wherein the voltage delivered by the induction coil (B) changes and that provides the power control circuitry (4) to supply the microcontroller (2) and the electronic circuits (3) with constant and uninterrupted voltage.

In the kitchen appliance (1) of the present invention, when the power scale setting is changed on the induction heating cooker (K), the voltage level that is transferred from the induction coil (B) to the receiver coils (7, 107) changes. Particularly, if a low power scale is selected, the duty ratio of the induction coil (B) decreases and power is transferred to the receiver coils (7, 107) intermittently and the transferred voltage level falls below the level that can operate the microcontroller (2) and the electronic circuits (3). If a high power scale is selected on the induction heating cooker (K), the duty ratio of the induction coil (B) increases and power is delivered uninterruptedly from the receiver coils (7, 107); however, in this situation, the transferred voltage rises to a level that can damage the microcontroller (2) and the electronic circuits (3). By one or more than one receiver coil (7, 107) being activated or deactivated by means of the switching means (8) actuated by the microcontroller (2) in situations wherein the voltage transferred from the induction coil (B) changes, if the voltage level is low, it is increased, if high, then decreased, thereby the power control circuitry (4) is provided to supply the microcontroller (2) and the electronic circuits (3) with a constant, uninterrupted and ripple-free DC voltage (for example 5V). The microcontroller (2) is prevented from erasing the data relating to the program being implemented in the kitchen appliance (1) by resetting at any moment under variable voltage conditions and the electronic circuits (3) are provided to operate soundly, protected from fluctuating voltages and prevented from malfunctioning.

In an embodiment of the present invention, the receiver coils (7, 107) are positioned separately on the kitchen appliance (1), for example at the base of the kitchen appliance (1), so as to be within the magnetic field generated by the induction coil (B) (FIG. 2).

In another embodiment of the present invention, the receiver coils (7, 107) are connected in series and have a common end (C) (FIG. 1).

In another embodiment of the present invention, the receiver coils (7, 107) are positioned one within the other on the kitchen appliance (1) so as to be within the magnetic field generated by the induction coil (B) (FIG. 3).

In another embodiment of the present invention, the receiver coils (7, 107) are positioned one above the other on the kitchen appliance (1) so as to be within the magnetic field generated by the induction coil (B).

In another embodiment of the present invention, the receiver coils (7, 107) are connected in parallel.

In another embodiment of the present invention, the receiver coils (7, 107) have different numbers of winding.

In an embodiment of the present invention, the kitchen appliance (1) comprises a peak voltage tracker (9) that is disposed between the rectifier (5) and the buffer capacitor (6) and that tracks the peak values of the voltage at the outlet of the rectifier (5) and feeds back to the microcontroller (2).

The microcontroller (2) provides the activation or deactivation of one or more than one receiver coil (7, 107) with respect to the voltage level desired to be decreased/increased by actuating the switching means (8) depending on the feedback of the peak voltage tracker (9) in situations of changes in power scale settings, AC mains voltage fluctuations that operate the induction coil (B) and in variable power requirements of the electronic circuits (3).

The microcontroller (2) decreases the number of receiver coils (7, 107) activated by means of the switching means (8) and provides the voltage to decrease if the voltage level detected and fed-back by the peak voltage tracker (9) is higher than the voltage level wherein the microcontroller (2) and the electronic circuits (3) are kept active.

The microcontroller (2) increases the number of receiver coils (7, 107) activated by means of the switching means (8) and provides the voltage to increase if the voltage level detected and feed-back by the peak voltage tracker (9) is lower than the voltage level wherein the microcontroller (2) and the electronic circuits (3) are kept active.

In another embodiment of the present invention, the kitchen appliance (1) comprises a transformer (10) that is disposed between the receiver coils (7, 107) and the rectifier (5), that has a primary winding (P) and more than one secondary winding (S1, S2) and a switching means (108) which activates or deactivates the secondary windings (S1, S2) by switching, and a resonant circuit (11) that is disposed after the transformer (10) and that has more than one resonant capacitor (C1, C2) resonating with the secondary windings (S1, S2) of the transformer (10) and one or more than one switching means (208) activating or deactivating the resonant capacitors (C1, C2) (FIG. 3).

In this embodiment, with the triplet of multiple receiver coil (7, 107)—transformer (10)—resonant circuit (11), voltage optimization is provided and the power control circuitry (4) is provided to supply the microcontroller (2) and the electronic circuits (3) with constant, uninterrupted and ripple-free voltage.

If the voltage delivered from the induction coil (B) is high, first the number of receiver coils (7, 107) activated by means of the switching means (8) is decreased, then the number of secondary windings (S1, S2) activated by means of the second switching means (108) on the transformer (10) is decreased and finally the number of the resonant capacitors (C1, C2) activated by means of the third switching means (208) on the resonant circuit (11) is decreased, thereby the voltage is decreased. If the voltage delivered from the induction coil (B) is low, the above-mentioned process is performed in a reverse manner and first the number of receiver coils (7, 107) activated is increased, then the number of secondary windings (S1, S2) activated on the transformer (10) is increased and finally the number of the resonant capacitors (C1, C2) activated on the resonant circuit (11) is increased.

When the induction heating cooker (K) is operated by the user at low power setting, the durations whereat the induction coil (B), that particularly operates in on/off manner, is "off" are prolonged and in this case it becomes difficult to supply uninterrupted voltage for the microcontroller (2). In situations wherein the induction heating cooker (K) is operated at low power settings and in cases wherein the power stored in the buffer capacitor (6) is not sufficient for supplying the microcontroller (2) with constant voltage level, components like LED, display, backlight disposed on in the kitchen appliance (1) and that draw high power are deactivated by the microcontroller (2), decreasing the load of the buffer capacitor (6) and the microcontroller (2) is provided to be supplied with uninterrupted voltage.

In an embodiment of the present invention, the kitchen appliance (1) is a ferromagnetic cooking container that is heated with the induction energy generated by the induction coil (B).

In another embodiment of the present invention, the kitchen appliance (1) is an active heating appliance having a resistant heater like kettle or toaster.

In another embodiment of the present invention, the kitchen appliance (1) is an electromechanical appliance operated by an electric motor like mixer, blender, food processor etc.

In an embodiment of the present invention, the kitchen appliance (1) is an automatic coffee machine and provides cooking control by an infrared sensor, the power control circuitry (4) supplies the electronic circuit (3) and the microcontroller (2) controlling the infrared sensor with uninterrupted and constant voltage by means of the multiple receiver coils (7, 107).

In another embodiment of the present invention, the kitchen appliance (1) comprises one or more than one high power receiver coil (12) that delivers power from the induction coil (B) for operating members (M) that draw high current like heater or motor (FIG. 1, FIG. 2).

In the kitchen appliance (1) of the present invention, the voltage transferred from the receiver coil (7, 107) is regulated by the multiple receiver coil (7, 107), providing the microcontroller (2) and the electronic circuits (3) to be supplied with constant and uninterrupted voltage. In situations wherein the user changes the settings of the induction heating cooker (K) and in variable mains AC voltage conditions, occurrence of error in the microcontroller (2) and the electronic circuits (3) is prevented and the microcontroller (2) and the electronic circuits (3) are protected from variable voltage conditions. High cost and hard to use components like battery or super capacitor are not required for keeping the voltage level supplied by the power control circuitry (4) constant.

It is to be understood that the present invention is not limited by the embodiments disclosed above and a person skilled in the art can easily introduce different embodiments. These should be considered within the scope of the protection disclosed by the claims of the present invention.

The invention claimed is:

1. A kitchen appliance, for being wirelessly operated on an induction heating cooker with power transmitted by an induction coil of the induction heating cooker, the kitchen appliance comprising:
   a microcontroller;
   one or more electronic circuits electrically coupled to the microcontroller;
   power control circuitry that supplies the microcontroller and the one or more electronic circuits with low level DC voltage, the power control circuitry including a rectifier that is disposed in the power control circuitry and that converts AC voltage to the DC voltage and a buffer capacitor that filters the DC voltage at an outlet of the rectifier, the power control circuitry further including a peak voltage tracker that tracks peak values of the DC voltage at the outlet of the rectifier and provides feedback to the microcontroller, the peak voltage tracker coupled to and disposed between the rectifier and the buffer capacitor;
   two or more receiver coils that partially collect the power generated by the induction coil and provide transfer of the collected power to the power control circuitry, the two or more receiver coils including a first receiver coil and a second receiver coil; and
   a switch that activates the first receiver coil and the second receiver coil in a first switch-position and that deactivates the first receiver coil and activates the second receiver coil in a second switch-position, wherein the microcontroller controls the switch between the first switch-position and the second switch-position based on the feedback provided by the peak voltage tracker.

2. The kitchen appliance as in claim 1, wherein the two or more receiver coils are separately positioned.

3. The kitchen appliance as in claim 1, wherein the two or more receiver coils are positioned one within the other.

4. The kitchen appliance as in claim 1, wherein the two or more receiver coils are positioned one above the other.

5. The kitchen appliance as in claim 1, wherein the two or more receiver coils are connected in series.

6. The kitchen appliance as in claim 1, wherein the two or more receiver coils are connected in parallel.

7. The kitchen appliance as in claim 1, wherein the two or more receiver coils have different numbers of windings.

8. The kitchen appliance as in claim 1, further comprising a transformer and a resonant circuit disposed between the receiver coils and the rectifier.

9. The kitchen appliance as in claim 1, wherein the kitchen appliance is a ferromagnetic cooking container that is heated by the power transmitted by the induction coil.

10. The kitchen appliance as in claim 1, wherein the kitchen appliance is an active heating appliance having a resistant heater.

11. The kitchen appliance as in claim 1, wherein the kitchen appliance is a electromechanical appliance including an electric motor.

12. The kitchen appliance as in claim 1, wherein the kitchen appliance is a coffee machine that provides cooking control using an infrared sensor.

13. The kitchen appliance as in claim 1, further comprising one or more high power receiver coils that delivers the power transmitted by the induction coil for operating members including at least one of a heater and a motor.

* * * * *